Nov. 14, 1967  R. C. NORDBERG ETAL  3,352,654
METHOD FOR HEAT TREATMENT OF VITREOUS FIBERS
Original Filed June 20, 1960  2 Sheets-Sheet 1
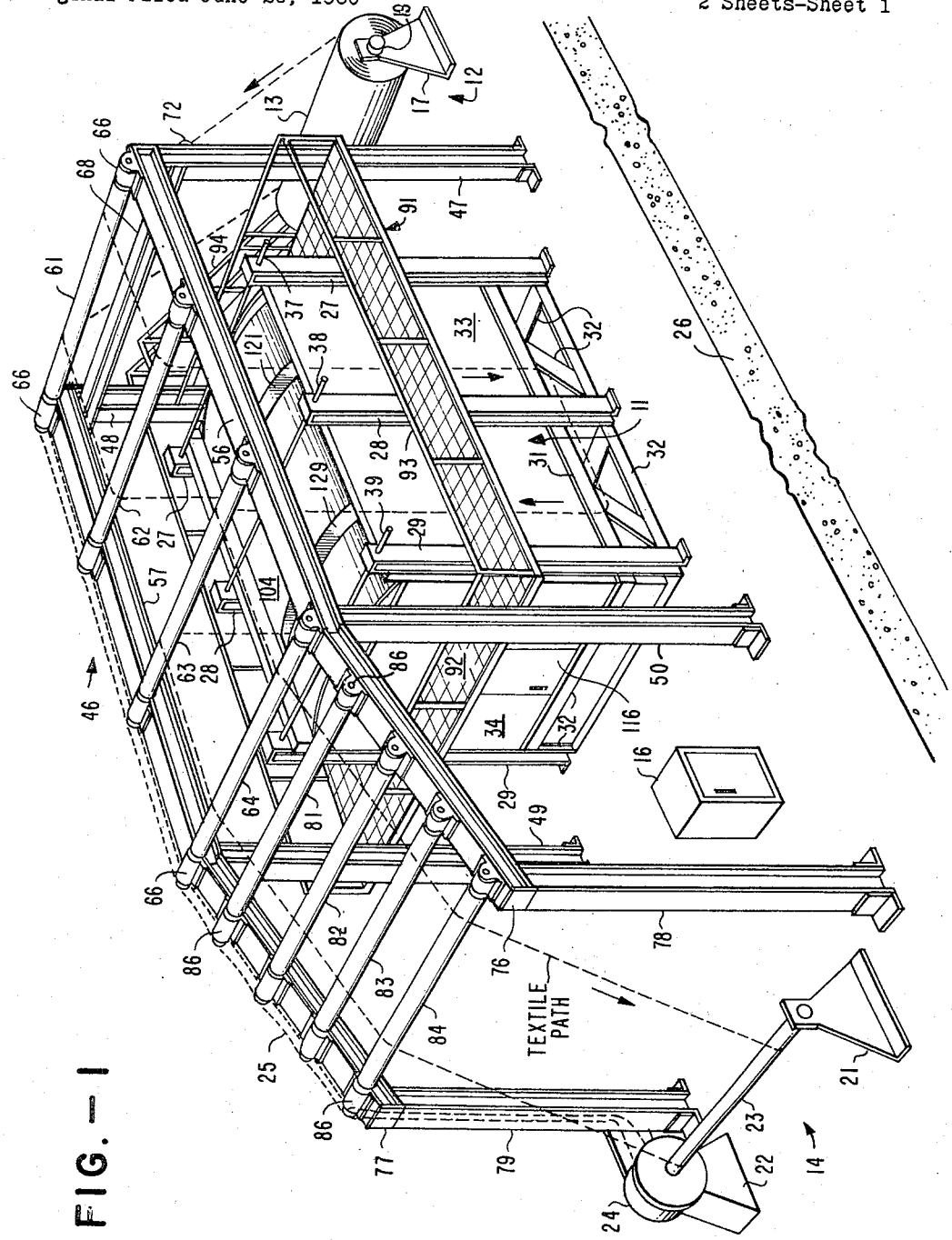
FIG.—1
INVENTORS
ROBERT C. NORDBERG
HECTOR R. BARRIOS
BY
*Fraser and Bogucki*
ATTORNEYS

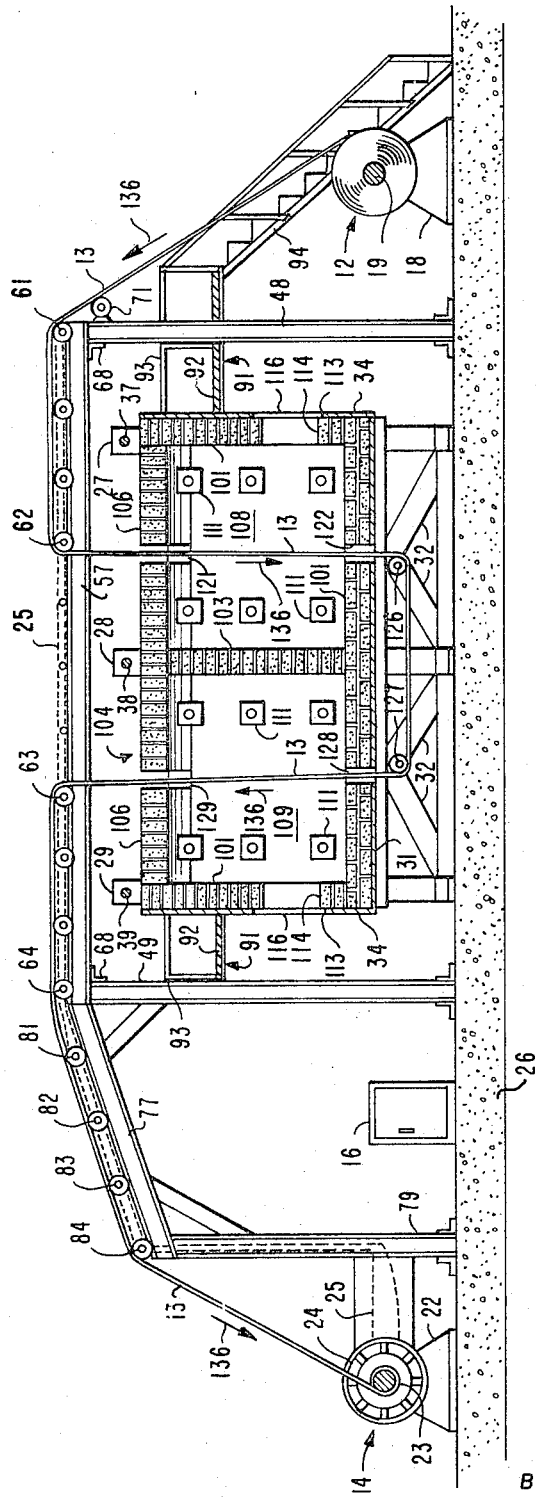

United States Patent Office 3,352,654
Patented Nov. 14, 1967

3,352,654
METHOD FOR HEAT TREATMENT
OF VITREOUS FIBERS
Robert C. Nordberg and Hector R. Barrios, La Mirada, Calif., assignors to Hitco, a corporation of California
Original application June 20, 1960, Ser. No. 37,493, now Patent No. 3,188,066, dated June 8, 1965. Divided and this application Feb. 18, 1964, Ser. No. 352,411
5 Claims. (Cl. 65—23)

This application is a division of U.S. patent application Ser. No. 37,493, filed June 20, 1960, and now U.S. Patent No. 3,188,066.

The present invention relates to vitreous fibers in woven, mat or batt form and, more particularly, to a method and apparatus for the heat treatment of such fibers.

A method of producing glass fibers having a high silica content, from 96 to 99 percent or more on a dehydrated basis, in woven, mat or batt form is described in United States Letters Patent No. 2,491,761. In general, such method includes the steps of leaching the prepared fibers in a suitable acid solution to extract substantially all of the oxides other than silica, washing with water to remove the acid, and then drying to remove the water.

To improve the characteristics of the resulting product for certain uses the dried fiber material is heat treated or fired to further dehydrate and to shrink the fibers. During this latter heat treating it has been found that the result is not uniform in that discoloring of the fibers occurs from carbonaceous materials acquired prior to the leaching step which are not completely removed by the heating at the temperature required for proper heat treatment.

An object of the present invention is, therefore, to provide an improved method of treating high silica content fibers.

Another object of the invention is to provide a method of treating high silica content fibers to uniformly remove carbon formed during the leaching process and to provide dehydration and an irreversible shrinkage of the fibers.

A further object of the invention is to provide a heat treating furnace for carrying out the method of the invention.

In accordance with the invention, the heat treatment method is carried out in two separate steps. The first step is accomplished at an elevated temperature for a period of time to remove the carbon from the fibers. The second step is at a more elevated temperature to provide an irreversible shrinkage of the fibers and at the same time, to provide substantially complete removal of the water content of the fibers. These two steps are consecutive, in the order set forth, and with strip forms of the fiber material are performed continuously.

To eliminate handling between the two steps, and to provide high speed and economical heat treatment, a two-stage furnace is provided in accordance with the invention and includes two heating chambers and means for moving a continuous sheet of the fibrous material from one chamber to the other. The first furnace chamber is evenly heated to a controlled temperature, such as approximately 1200° F., which is an optimum temperature for burning off the carbon formed during the leaching process. The second chamber is similarly heated to a higher temperature, such as approximately 1800° F., which is the optimum temperature for dehydration and for irreversible shrinkage of the fibers.

Other objects and advantages will be apparent from the following description and claims considered together with the accompanying drawings, in which:

FIG. 1 is a perspective view of a two-stage furnace arrangement of the invention; and FIG. 2 is an elevation cross-section of the furnace of FIG. 1.

Referring now to the drawings in detail, and FIG. 1 in particular, there is shown a perspective view of a furnace structure in accordance with the invention. The furnace structure includes a two-stage furnace 11, a supply reel arrangement 12 of textile fiber material 13 to be treated, and a takeup reel arrangement 14 for the material after treatment. For convenience of illustration, the path along which the material 13 to be treated is trained through the furnace is shown only in phantom in FIG. 1, but will be set forth hereinafter. Also, a control cabinet 16 is shown to house both the furnace temperature controls and the takeup reel controls, both of which are conventional and the details of which are omitted for ease of illustration. The takeup reel 14 may be turned manually of course or controlled by an operator.

The supply reel arrangement 12 is shown at one end of the furnace 11 as two spaced-apart pillars 17 and 18 for rotatably supporting a shaft 19 upon which the material 13 is mounted in roll form. Similarly, the takeup reel arrangement 14 is shown at the opposite end of the furnace 11 as two pillars 21 and 22 mounted in spaced-apart relation for rotatably supporting a shaft 23. A motor 24 may be suitably mounted on one of the takeup pillars 21 and is mechanically coupled to the shaft 23 to provide a controlled speed of rotation thereto. Conventional electrical controls (not shown) connected between the motor 24 and a source of power (not shown), are suitably mounted within the cabinet 16. Rollers (described in more detail below) mounted on the furnace may be driven by a chain drive 25 from the motor 24. Thus, with the material 13 trained through the furnace 11 and suitably affixed by the end to the shaft 23 of the takeup reel arrangement 14, rotation of the shaft 23 by the motor 24 results in a movement of the material 13 through the furnace. Alternatively, the material may be driven by the rollers alone, or by a combination of the takeup reel 14 and the rollers.

Between the takeup reel 14 and the supply reel 12, and supported in spaced-apart and parallel alignment on a common foundation 26 are three pairs of spaced and aligned upright stanchions 27, 28 and 29. A base plate 31 is suitably mounted parallel to the foundation 26 within the area defined by the stanchions 27, 28 and 29, as by supporting structural members 32. Side plates 33 and end plates 34 are provided to define the outline of the furnace 11 and are affixed to the base plate 31, and to each other, where required, by a combination of angle elements (not shown) fastened therebetween, as by welding. To maintain the arched roof of the furnace together and in alignment despite thermal expansion, each pair of stanchions is spanned by an expansion rod 37, 38 and 39 extended therethrough and suitably spring-loaded (not shown) at the extended ends.

A suitable frame structure 46 is mounted about the furnace 11 for guiding the material 13 which is to be treated in and out of the furnace from the supply reel 12 to the takeup reel 14. Four upright supports 47, 48, 49 and 50 are mounted on the foundation 26 and spaced outwardly from the end pairs of stanchions 27 and 29, respectively, in aligned relation. The extended ends of the four upright supports 47–50 reach above the upper ends of the stanchions 27–29 and have two beams 56 and 57 mounted thereon parallel to the sides 33 of the furnace 11. Four similar rollers 61, 62, 63 and 64 driven by the chain drive 25 are transversely mounted in parallel and spaced relation between the two beams 56 and 57, as by bearings 66 suitably affixed to the beams. Two cross bars 68 (only one being shown in FIG. 1) are respectively mounted between the upper ends of pairs of the upright supports 47, 48, 49 and 50 transverse to the beams 56 and 57 for added rigidity of the frame structure 46. A fifth driven roller 71 is rotatable between two similar bearings 72, which are mounted at the upper ends of two of the supports 47 and 48 to maintain the roller parallel to the supply reel 12.

Between the frame structure 46 and the takeup reel 14, two beam extensions 76 and 77 are angularly disposed in parallel relation to each other from suitable attachments at the ends of the respective beams 56 and 57. The extensions 76 and 77 angle downwardly from the beams 56 and 57 to two additional upright supports 78 and 79 having a lesser length than the four supports 47–50. A plurality of additional rollers 81, 82, 83 and 84 also driven by the chain drive 25 are mounted by suitable journals 86 in parallel and spaced relation transversely between the two extension beams 76 and 77. Thus, the material 13 after emerging from the furnace 11 is suitably supported along a sloping path toward the takeup reel 14. If the rollers 61–64 and 81–84 are used alone for driving the material 13, additional rollers (not shown) may be used to provide loops in the material 13 and increase the frictional contact if desired.

For external inspection of the furnace 11 and the various rollers mounted on the frame structure 46, a catwalk 91 is mounted between the stanchions 27, 28 and 29 and the upright supports 47–50 at the upper ends thereof to extend about the furnace. Such catwalk 91 comprises a walkway 92 and a handrail 93 with a stair 94 provided to reach the walkway.

Referring now to the furnace 11, as shown in elevational cross-section in FIG. 2, fire bricks 101 are conventionally laid across the base plate 31 to provide a floor and against the side and end plates 33 and 34 to provide walls. A central wall 103 is built up of additional fire bricks 101 to extend transversely between the side plates 33 and parallel to the end plates 34. The furnace areas thus defined are enclosed by a roof 104 of fire brick 106 and such roof is arched between the side plates 33. A first furnace chamber 108 and a second furnace chamber 109 are therefore established in the volumes within the outer walls on either side of the central wall 103.

The side walls of each chamber 108 and 109 are provided with a plurality of spaced-apart burner blocks 111 for mounting a plurality of conventional gas jets (not detailed) with suitable gas pipes (not shown) connected thereto. Thus, as shown in FIG. 2, two rows of three burner blocks 111 are mounted in the side walls of each of the first and second chambers 108 and 109, thereby placing twelve such blocks in each of the chambers. The number of blocks 111 and associated jets are merely illustrative and any other conventional furnace firing system for bringing the two furnace chambers 108 and 109 up to the desired uniform heating temperatures could be used. As stated previously, the necessary controls for the furnace 11 are disposed in the control cabinet 16 and suitably connected, as by conduits (not shown) to the furnace elements.

To permit interior inspection of the furnace chambers 108 and 109, each of the respective end plates 34 thereof is proivded with an opening 113, which communicates with a matching opening 114 in the adjacent brickwork 101 of the end wall. A door 116 mounted within each of the openings 113 of the end plates 34 serves as a closure for such opening.

A slot 121 extends through the brickwork 106 of the roof 104 transverse to the side plates 33, parallel to and midway between the central wall 103 and the end plate 34 of the first furnace chamber 108. Another similar slot 122 is provided in the floor brickwork 101 and the base plate 31 in direct alignment (when considered in plan view) with the roof slot 121. Thus, the material 13 to be treated may be readily extended into the first chamber 108 through the roof slot 121 and out through the floor slot 122.

To guide the material 13 from the first furnace chamber 108 to the second furnace chamber 109, a first driven roller 126 coupled to the chain drive 25 is rotatably mounted parallel to the floor slot 122 between suitable journals (not shown) carried by the supporting structural members 32. Also, a second similar roller 127 driven by the chain drive 25 is rotatably mounted substantially midway between the central wall 103 and the end plate 34 of the second furnace chamber 109 in parallel relation with respect to the first roller 126. The second furnace chamber 109 is also provided with a floor slot 128 and a roof slot 129 with such slots being similar in all respects to those of the first furnace chamber 108. The material 13, then, as it emerges from the first furnace chamber 108 is guided by the first and second rollers 126 and 127 through the floor slot 128 into the second furnace chamber 109. The roof slot 129 provides an exit for the material 13 after it proceeds through the furnace chamber 109 to be guided further by the rollers 63 and 64.

In the foregoing structural description of the furnace 11 and surrounding structural frame 46, some of the mounting details have been omitted for simplicity of illustration and as being conventional. Thus, many of the mounting relationships may be accomplished by suitable bolts, as for steel to concrete joinders, and others by welding, as for steel to steel joints. Additionally, as has been previously set forth, the respective controls for the two sections or chambers 108 and 109 of the furnace 11 have been omitted for similar reasons and may include a circuit having thermocouples, thermostats, safety vales, igniters, etc. For the same reasons there has been omitted a detailed description of the control circuit for the motor 24, which is preferably of variable speed. While the motor 24 is shown directly coupled to the shaft 23 of the takeup reel 14, such motor may be separately mounted with a chain drive coupled to the shaft and, if desired, to one or more of the guide rollers of the structural frame 46.

In accordance with the foregoing the material 13, such as woven textiles of high vitreous silica content, is unwound from a roll of such material rotatably supported on the shaft 19 of the supply reel 12 and is trained upward to contact the surface of the two rollers 71 and 61 of the frame structure 46. The material 13 is then extended over the next roller 62 and down through the roof slot 121 into the first furnace chamber 108. Next, the path of the material 13 extends downward through the first furnace chamber 108 to emerge from the floor slot 122 and further extends under the first roller 126 of the supporting members 32 to the second roller 127 thereof. The two rollers 62 and 126 are offset with respect to each other so that the vertical path of the material 13 through the first furnace chamber 108 includes the center line of both the roof slot 121 and the floor slot 122; that is, the two rollers are oriented with respect to each other so that the trailing contact surface of roller 62 is tangential with respect to the leading contact surface of roller 126 and the two rollers respectively rotate in opposite directions.

From the second roller 127 of the supporting structural members 32 the material 12 passes vertically upward through the floor slot 128 of the second furnace chamber 109, out through the roof slot 129, and then over the aligned roller 63 of the frame structure 46. The two rollers 127 and 63 are oriented with respect to each other and with respect to the respective center line of the two slots 128 and 129 of the second furnace chamber 109 in the same manner as that described for the two rollers 62 and 126 of the first furnace chamber 108. The path of the material 13 next extends from the roller 63 over the following roller 64 of the frame structure 46 and, thence, over the four rollers 81–84 of the sloping extension beams 76 and 77 to the driven shaft 23 of the takeup reel 14.

During the manufacture of fibrous glass material prior to weaving into textile material 13, a sizing or coating material is applied to the fibers. The sizing compound is usually organic, and serves to make the fibers stronger and easier to handle and permits the weaving to be accomplished more rapidly. Such sizing also serves to strengthen the fibers during and after the leaching process and does not prevent or interfere with the removal of oxides other than silica. However, the heat treating temperatures necessarily result in the oxidation and removal of at least part of the sizing compound. The application of the heat treat temperature usually results in incomplete combustion and the formation of residual carbon deposits on the fibers. The presence of residual carbon deposits causes discoloration and lack of uniformity in the textile materials, and unacceptability for many purposes. Heretofore, it has been considered necessary to utilize the heat treating surface for removal of coatings on the fibers, thus often encountering difficulties with imperfect oxidation. In accordance with aspects of the present invention, however, it is shown that the heating for burning of the coating may be separately accomplished from the heating for purpose of heat treating so as to provide complete and uniform removal of the coating without affecting the heat treating process.

Thus, with the material 13 extended along the previously described path, the gas jets are ignited in each of the first and second furnace chambers 108 and 109 to heat the respective chambers to controlled temperatures. Although different temperatures may be employed for different materials, and for producing different properties in the finished materials, temperatures of approximately 1200° and 1800° F. are usually used. After the heatup period the material 13 is moved continuously by the drive elements in the direction indicated by arrows 136 at a speed of approximately 4–12 feet per minute.

In accordance with the method of the present invention, the material 13 proceeds from the top to the bottom through the first furnace chamber 108 at a rate of 4–12 feet per minute. In one practical exemplification, the top to bottom dimension of the chamber 108 is approximately 8 feet and the total exposure length of the material 13 is approximately 8.5 feet. With this arrangement a speed of approximately 5.5 feet per minute was used. By disposing the heating elements, shown as mounted on the burner blocks 111, in parallel rows along the path of the material 13, the material is evenly heated during passage through the chamber 108. In this, the first step of the heat treatment, the degree of temperature and the period the material 13 is subjected thereto cooperate to remove the carbon compounds from the fibers of the material. No sudden temperature differential of a high order is applied which would tend to cause incomplete oxidation.

After the carbon has been removed from the material 13, the material is conveyed to the second furnace chamber 109 by way of the two rollers 126 and 127. Such second furnace chamber 109 is maintained at a higher temperature of approximately 1800° F. and has the same distribution of heating elements as the first chamber 108 to provide even heating throughout the length of the material 13 in the chamber. In the practical exemplification of the invention which was referred to, this second step of the heat treating was arranged to occur over substantially the same length of path and for the same period of time as the first step. The path lengths and exposure times may be varied between the two furnace chambers, however. Treatment at the higher temperature provides an irreversible shrinkage of the fibers of the material 13, as well as further removal of the water content of the material.

Prior to cooling of the material 13 the strength thereof is lessened so that precautions are necessary to prevent undue forces being applied. To such extent then, the heated material 13, after emerging from the second furnace chamber, is trained over a pair of rollers 63 and 64 of the frame structure 46 and then supported along a sloping path provided by the four rollers 81–84 of the extension beams 76 and 77 to the takeup reel 14.

Thus, in the foregoing there has been described a two stage, or chamber, furnace 11 for carrying out the heat treatment steps of the invention to produce a high silica content material 13 of uniform appearance and properties. The carbon compounds on the surfaces of the fibers of the material 13 are removed at one temperature without a high degree of temperature change being suddenly applied. Other advantageous properties are then developed, once the initial temperature has been achieved, by a second, higher, temperature following virtually immediately and continuously thereafter, when the organic coating has been completely removed.

In a complete process in accordance with the invention, after the vitreous silica fibers are initially suitably fabricated, as by weaving following coating with an organic sizing compound, the fibers (in textile form) are treated by leaching in an acid solution to remove oxides other than silica followed by washing by water to remove the acid and as much residual matter as possible, heating at a first temperature to drive out a portion of the water content and to remove carbon remaining after leaching, and, finally, heating to a second, higher, temperature to drive out the remainder of the water content and to irreversibly shrink the fibers of the material.

The vitreous silica fiber product developed by the foregoing is uniform in appearance and has uniform properties. Such material is useful for many different purposes for its high temperature properties, nuclear radiation shielding properties, and electrical insulation properties, among other uses.

The two stage furnace 11 has been described in detail as advantageously having a common wall 103 with the material 13 being transported in vertical paths on either side of the wall through two different temperature environments; however, where longitudinal space is available the heating chambers or sections could be readily placed end-to-end with the material proceeding therethrough along a horizontal path. In other arrangements the chambers may be disposed in other relative positions. Also, depending upon the length of the paths, the rate at which the material is moved may be varied over that specified in the foregoing description.

While there have been described above and illustrated in the drawings various methods and apparatus for the heat treatment of vitreous fibers, it will be appreciated that other modifications and variations may be employed. Accordingly, the invention should be taken to include all alternative forms falling within the scope of the appended claims.

What is claimed is:

1. The method of heat treating leached vitreous silica fibers coated with carbonaceous material which includes the steps of heating at a first temperature sufficient to remove the carbonaceous material but insufficient to heat shrink the fibers, and then heating at a second temperature, higher than the first, sufficient to heat shrink the fibers.

2. In a method of producing fibrous material of high silica content from fibrous glass coated with carbonaceous material, the steps comprising leaching the glass material in acid solution to substantially remove non-siliceous oxides, washing the leached material with water free of said acid, heating the washed material to a first temperature for a time sufficient to remove substantially all the carbonaceous material from said fibrous material while maintaining said fibrous material in the unshrunk form, and fiinally heating the heated material to a second temperature, higher than the first, and for a time sufficient to substantially heat shrink the fibrous material.

3. In a method of producing fibrous material of high silica content from glass fibers, the steps comprising preparing glass fibers in textile form with the fibers coated with an organic compound, leaching the prepared glass textile in an acid solution to substantially completely remove oxides other than silica, washing the leached textile in water to remove the acid, heating the washed textile at a first temperature and for a time sufficient to substanstantially completely remove all carbon-containing compounds and a portion of the water content while retaining the textile in essentially unshrunk form, and then heating the heated textile to a second higher temperature and for a time sufficient to irreversibly shrink the fibers and to remove the remainder of the water content.

4. In a method of producing fibrous material of high silica content from glass fibers, the steps comprising preparing the glass fibers in textile form with the fibers coated with an organic sizing compound, leaching the prepared glass textile in an acid solution to remove oxides other than silica, washing the leached textile in water to remove the acid, heating the washed textile at a temperature of substantially 1200° F. and for a time sufficient to remove essentially all the carbonaceous sizing compound and a portion of the water content while retaining the fibers in unshrunk form, and subsequently heating the heated textile to a higher temperature of substantially 1800° F. for a time sufficient to irreversibly shrink the fibers of the textile and to remove the remainder of the water content.

5. The method of claim 4 wherein the two heating steps are substantially of the same duration.

References Cited

UNITED STATES PATENTS

| | | | |
|---|---|---|---|
| 2,640,299 | 6/1953 | Sheard et al. | 65—38 |
| 2,995,803 | 8/1961 | Moore | 65—31 |
| 3,008,846 | 11/1961 | Caroselli | 65—111 |

DONALL H. SYLVESTER, *Primary Examiner.*

G. R. MYERS, D. CRUPAIN, *Assistant Examiners.*